(12) United States Patent
Kiser et al.

(10) Patent No.: US 10,773,908 B2
(45) Date of Patent: Sep. 15, 2020

(54) VEHICLE RAMP LATCH

(71) Applicant: The Braun Corporation, Winamac, IN (US)

(72) Inventors: Aaron Kiser, Royal Center, IN (US); James Stoner, Star City, IN (US)

(73) Assignee: The Braun Corporation, Winamac, IN (US)

( * ) Notice: Subject to any disclaimer, the term of this patent is extended or adjusted under 35 U.S.C. 154(b) by 105 days.

(21) Appl. No.: 15/816,343

(22) Filed: Nov. 17, 2017

(65) Prior Publication Data
US 2018/0140483 A1    May 24, 2018

Related U.S. Application Data

(60) Provisional application No. 62/424,070, filed on Nov. 18, 2016.

(51) Int. Cl.
*B65G 69/28* (2006.01)
(52) U.S. Cl.
CPC .................... *B65G 69/28* (2013.01)
(58) Field of Classification Search
CPC ... A61G 3/061; A61G 3/06; B60P 1/43; B60P 1/435; B65G 69/28; B65G 69/2805; B65G 69/30
See application file for complete search history.

(56) References Cited

U.S. PATENT DOCUMENTS

| | | | | |
|---|---|---|---|---|
| 2,619,395 A | * | 11/1952 | Kent | B60N 3/004 108/38 |
| 4,084,713 A | * | 4/1978 | Rohrs | A61G 3/061 14/69.5 |
| 4,944,546 A | * | 7/1990 | Keller | B60P 1/435 108/130 |
| 5,907,276 A | * | 5/1999 | Lance | B60P 1/435 14/71.1 |
| 6,241,452 B1 | * | 6/2001 | Eekhoff | B60P 1/43 14/71.1 |
| 6,802,095 B1 | * | 10/2004 | Whitmarsh | B60P 1/431 14/69.5 |
| 8,051,519 B1 | * | 11/2011 | Adams | B60P 1/43 14/69.5 |
| 2002/0093161 A1 | * | 7/2002 | Udwin | B62K 3/002 280/87.05 |
| 2003/0047914 A1 | * | 3/2003 | Smith | B62B 5/06 280/659 |
| 2014/0356116 A1 | * | 12/2014 | Hermanson | A61G 3/061 414/519 |
| 2017/0113887 A1 | * | 4/2017 | Pendleton | B60P 1/43 |

* cited by examiner

*Primary Examiner* — Glenn F Myers
(74) *Attorney, Agent, or Firm* — Taft Stettinius & Hollister LLP; Ryan O. White (57) ABSTRACT

A ramp assembly with an inboard ramp section, an outboard ramp section pivotally coupled to the outboard ramp section, a knob coupled to one of the inboard ramp section or the outboard ramp section, a ramp latch coupled to the other of the inboard ramp section or the outboard ramp section, the ramp latch comprising, an elongated shaft extending from a proximal section towards a distal section, a first arcuate jaw extending from the distal section away from the elongated shaft, a second arcuate jaw extending from the distal section away from the elongated shaft, the first and second arcuate jaw defining an opening therebetween, and wherein the knob is selectively positionable at least partially within the opening.

11 Claims, 7 Drawing Sheets

VEHICLE RAMP LATCH

RELATED APPLICATIONS

The present application claims the priority of U.S. Provisional Application No. 62/424,070 filed Nov. 18, 2016 and titled "VEHICLE RAMP LATCH", the contents of which are incorporated herein in entirety.

TECHNICAL FIELD

The present teachings are generally related to a latch assembly, and more particularly to latch assembly for preventing a foldable vehicle ramp from rattling during transport.

BACKGROUND OF THE INVENTION

The statements in this section merely provide background information related to the present disclosure and should not be construed as constituting prior art.

To enhance the lives of mobility-impaired individuals, lifts, ramps, and other devices are known for providing access to vehicles such as vans, minivans, buses, sport utility vehicles ("SUV"), and the like to those confined to wheelchairs or mobility scooters. For example, lifts are sometimes installed in the doorway of a full-sized van, bus, or SUV. Lifts generally include a platform that is moveable from the ground surface to the floor level of the vehicle. Power for moving the platform is usually provided by electric motors or hydraulic, pneumatic, or electric actuators.

Often, the lower vehicle floor height provided by minivans and similar vehicles allows ramps to be installed instead of lifts. Different types of ramps include folding ramps, swing-out ramps, and ramps that are stored within a cassette provided in the floor of the vehicle. Each type of ramp is generally moveable between a deployed position for providing access to the vehicle, and a stowed position where the ramp is moved to a position inside the vehicle structure. Ramps can be moved between the stowed and deployed positions automatically or manually. Automatic ramps generally use electric motors, hydraulics, or pneumatics to move the ramp between the stowed and deployed positions. Manually operated ramps are generally stowed or deployed by grasping the ramp itself.

Bi-fold ramps in particular are gaining popularity for vehicle use due to their extended length, and therefore less severe angle of inclination, that facilitates entry into the vehicle for passengers using manual wheelchairs. The ramps are intermediately hinged such that they can be vertically oriented in a folded configuration when retracted. During use, the passenger advances their wheelchair up the ramp to a space in the vehicle. Once the wheelchair is securely positioned within the vehicle, the ramp is then folded to fit within the vehicle.

When the ramp is in the storage position, it is very common for the ramp to bounce or vibrate as the vehicle is in motion. Such constant vibration can cause unwanted noise inside the vehicle. To prevent the ramp from experiencing such unwanted noise, it is necessary to secure the ramp in such a manner that it does not excessively vibrate. The present teachings are intended to improve upon and resolve some of these known issues within the art.

SUMMARY

One embodiment is a ramp assembly with an inboard ramp section, an outboard ramp section pivotally coupled to the inboard ramp section, a knob coupled to one of the inboard ramp section or the outboard ramp section, a ramp latch coupled to the other of the inboard ramp section or the outboard ramp section, the ramp latch having an elongated shaft extending from a proximal section towards a distal section, a first arcuate jaw extending from the distal section away from the elongated shaft, a second arcuate jaw extending from the distal section away from the elongated shaft, the first and second arcuate jaw defining an opening therebetween. Wherein, the knob is selectively positionable at least partially within the opening.

In one example, the inboard ramp transitions between a folded state and a coplanar state relative to the outboard ramp section. In one aspect of this example, the knob is at least partially positioned within the opening when the inboard ramp is in the folded state. In another aspect of this example, the knob is not positioned within the opening when the inboard ramp is in the coplanar state.

Another example of this embodiment has an inboard side barrier coupled to the inboard ramp section and an outboard side barrier coupled to the outboard ramp section. In one aspect of this example, the knob is coupled to one of the inboard or outboard side barrier and the ramp latch is coupled to the other of the inboard or outboard side barrier.

In another example, the ramp latch is configured to snappingly engage the knob.

Another embodiment is a ramp assembly coupled to a vehicle, the ramp assembly having an inboard section pivotally coupled to an outboard section, the inboard section and outboard section pivotal relative to one another between a folded state and a coplanar state, a latch assembly defining an opening and coupled to one of the inboard section or the outboard section, a knob coupled to the other one of the inboard section or the outboard section then the latch assembly. Wherein, the knob is at least partially positioned in the opening in the folded state.

In one example of this embodiment, the knob is not positioned in the opening in the coplanar state.

In another example, the latch assembly defines a substantially circular opening having a jaw diameter and the opening defines an opening width, the opening width being less than the jaw diameter. In one aspect of this example, the knob has a knob diameter that is about the same as the jaw diameter.

In another example, the latch assembly defines an engagement surface that at least partially contacts the knob in the folded state. In another aspect of this example, the engagement surface comprises a noise reducing material. In another aspect of this example, the engagement surface comprises a friction reducing material.

In yet another embodiment, a ramp latch assembly has an inboard ramp section pivotally coupled to an outboard ramp section, a ramp latch coupled to one of the inboard ramp section or the outboard ramp section, a knob coupled to the other of the inboard ramp section or the outboard ramp section than the ramp latch. Wherein, the ramp latch snappingly engages the knob when the inboard ramp section is in a folded state relative to the outboard ramp section.

In one example of this embodiment, the ramp latch has a first arcuate jaw and a second arcuate jaw. In one aspect of this example, the first arcuate jaw and the second arcuate jaw deflect as the ramp latch snappingly engages the knob.

In another example, the engagement of the knob with the ramp latch maintains inboard ramp section in the folded state until a knob transition force rotates the inboard ramp section away from the outboard ramp section, thereby disengaging the knob from the ramp latch.

In another example, an inboard side barrier is coupled to the inboard ramp section and an outboard side barrier is coupled to the outboard ramp section. In one aspect of this example, the ramp latch is coupled to one of the inboard side barrier or the outboard side barrier and the knob is coupled to the other of the inboard side barrier or the outboard side barrier.

BRIEF DESCRIPTION OF THE DRAWINGS

The above-mentioned aspects of the present teachings and the manner of obtaining them will become more apparent and the teachings themselves will be better understood by reference to the following description of the illustrative embodiments taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unless defined otherwise, all technical and scientific terms used herein have the same meaning as commonly understood by one of ordinary skill in the art to which this invention belongs. Although any method and materials similar or equivalent to those described herein can be used in the practice or testing of the present invention, the specific methods and materials are now described. Moreover, the techniques employed or contemplated herein are standard methodologies well known to one of ordinary skill in the art and the materials, methods and examples are illustrative only and not intended to be limiting.

FIGS. 1-4 show an illustrative vehicle ramp latch 10 in accordance with one embodiment of the present teachings. According to this embodiment, the vehicle ramp latch 10 includes an elongated shaft 12 having a proximal section 14 and a distal section 16 opposite thereof along a longitudinal axis 18. Proximate to the distal section 16 of the elongated shaft 12 is a hub portion 20 that branches into a jaw member 21 defined by a first substantially arcuate jaw 22 and a second substantially arcuate jaw 24. In accordance with certain aspects herein, the jaws 22, 24 are spaced apart from one another by a suitable amount to define a central opening 26 and together form an engagement surface 28 that is adapted to at least partially mate with an object placed therein. In other words, the engagement surface 28 formed by the jaws 22, 24 is designed to physically contact, and at least partially conform to, an object that is placed within the central opening 26 and into the jaw member 21. According to certain aspects herein, to allow the jaws 22, 24 to receive an object that is placed within the central opening 26, the central opening may be substantially u-shaped and configured to receive an object in a snap-fit manner.

Moving now to FIGS. 5-11, a vehicle ramp assembly 30 is shown in accordance with certain aspects of the present invention. While not shown herein, it should be understood and appreciated herein that the vehicle ramp assembly 30 may be coupled either directly or indirectly to a vehicle so that a wheelchair occupant can enter and exit the vehicle as needed. In accordance with the present embodiment, the vehicle ramp assembly 30 includes an inboard ramp section 32 that is adapted to couple to a vehicle. An outboard ramp section 34 is hingedly coupled to the outboard edge of the inboard ramp section 32. In operation, the ramp system 30 is deployed from and folded to a stowed state shown in FIGS. 5-7, where the ramp sections 32, 34 are folded substantially against one another. When the assembly 30 is operated, the ramp sections 32, 34 are deployed to a coplanar and inclined orientation with respect to a vehicle so that persons who are physically challenged or otherwise have limited mobility may board and leave the vehicle as needed (see FIGS. 8-11). It should be understood and appreciated herein that such a ramp system is not limited to wheelchairs, but may be used to provide vehicle access for carts or wheeled containers for transport by way of a vehicle.

Figure 1:
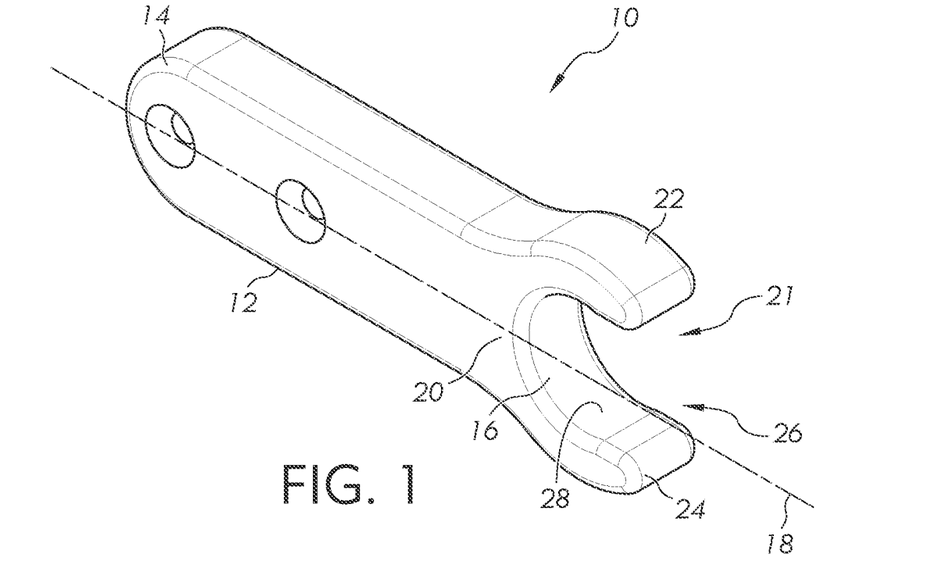
FIG. 1 represents a perspective view of an illustrative vehicle ramp latch in accordance with one embodiment of the present teachings.
Figure 2:
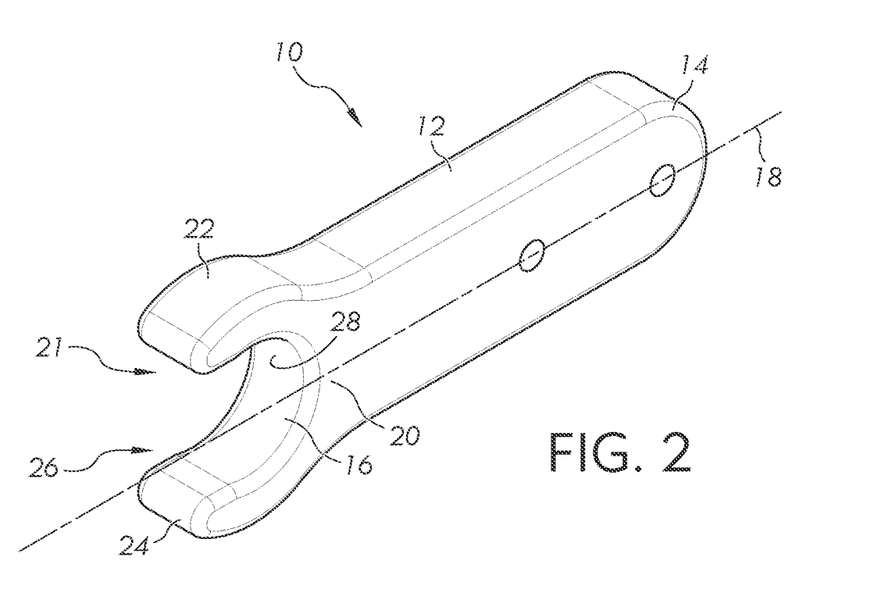
FIG. 2 represents another perspective view of the illustrative vehicle ramp latch of FIG. 1.
Figure 3:
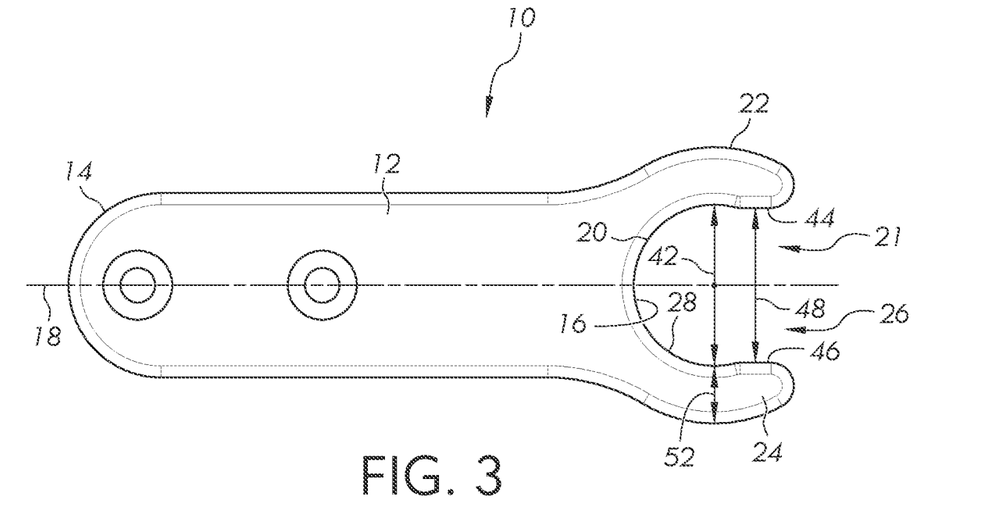
FIG. 3 represents a top view of the illustrative vehicle ramp latch of FIG. 1.
Figure 4:
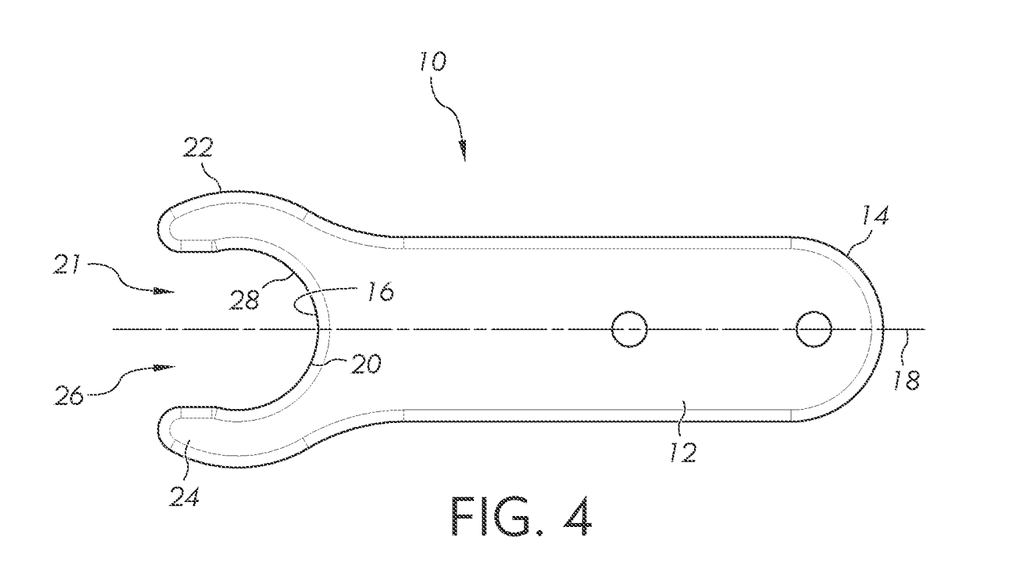
FIG. 4 represents a bottom view of the illustrative vehicle ramp latch of FIG. 1.
Figure 5:
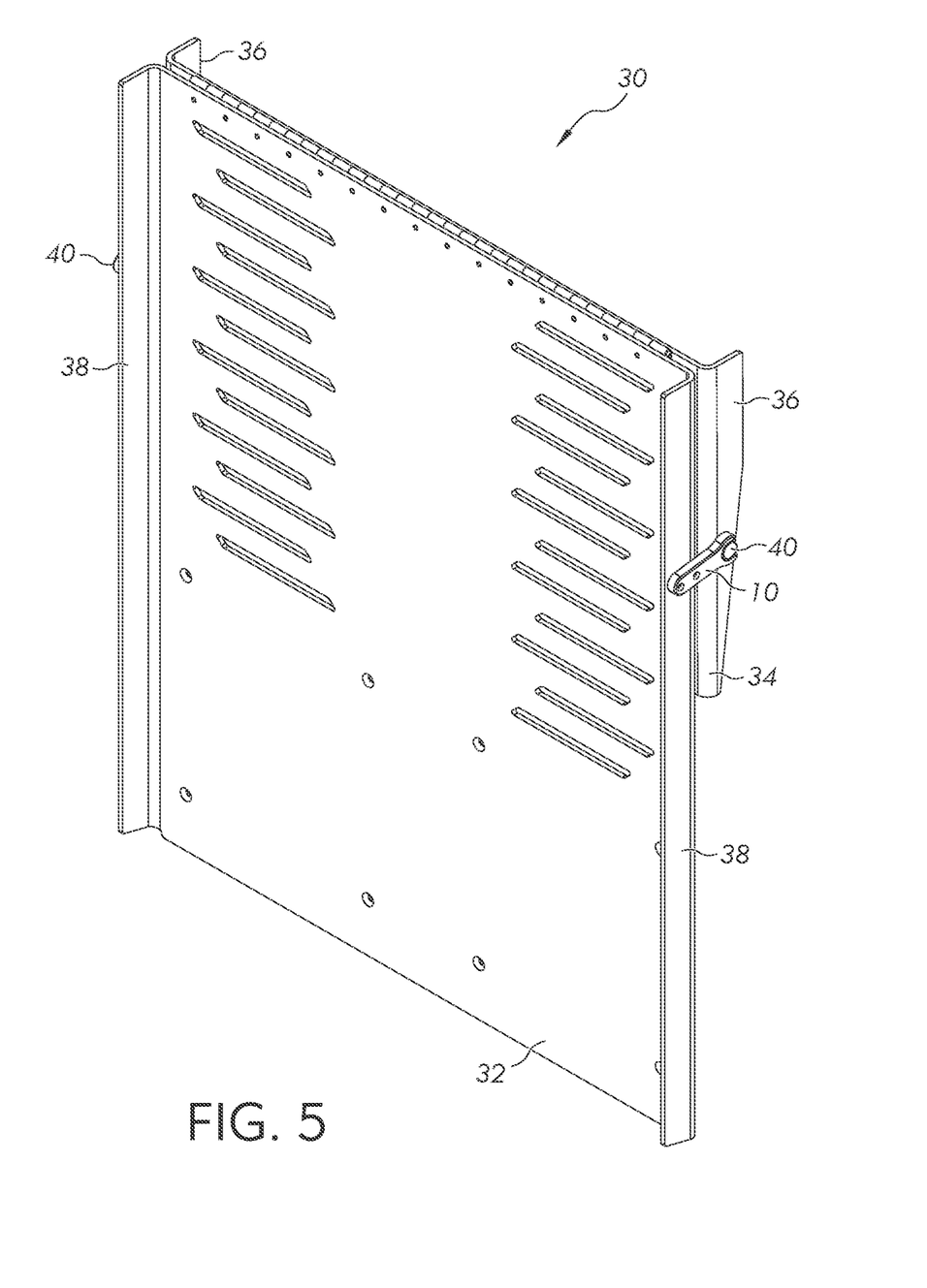
FIG. 5 represents a folded vehicle ramp assembly in which the vehicle ramp latch of FIG. 1 is securing two sections of the folded vehicle ramp assembly together.
Figure 6:
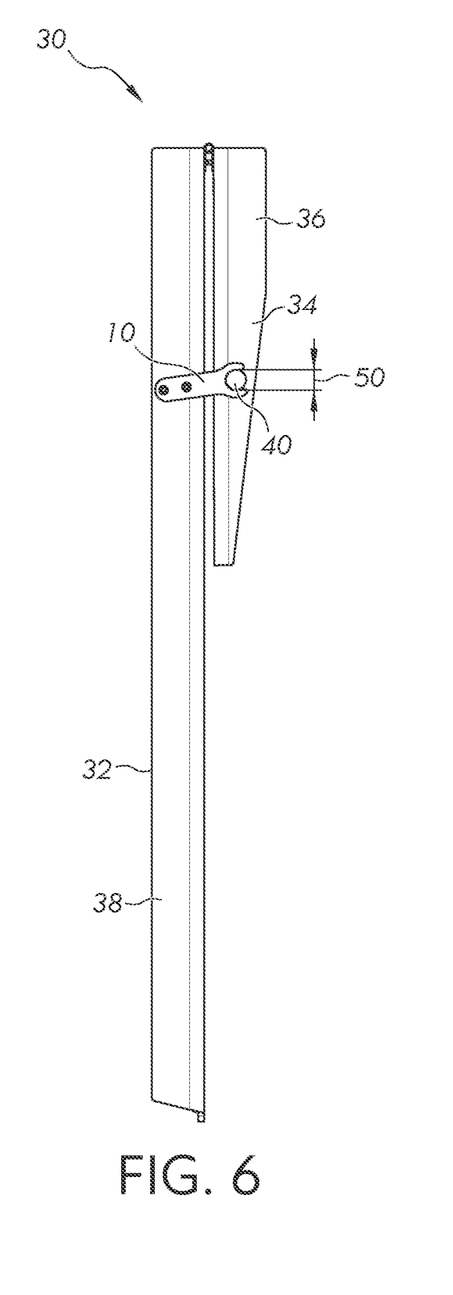
FIG. 6 represents a side view of the folded vehicle ramp assembly of FIG. 5.
Figure 7:
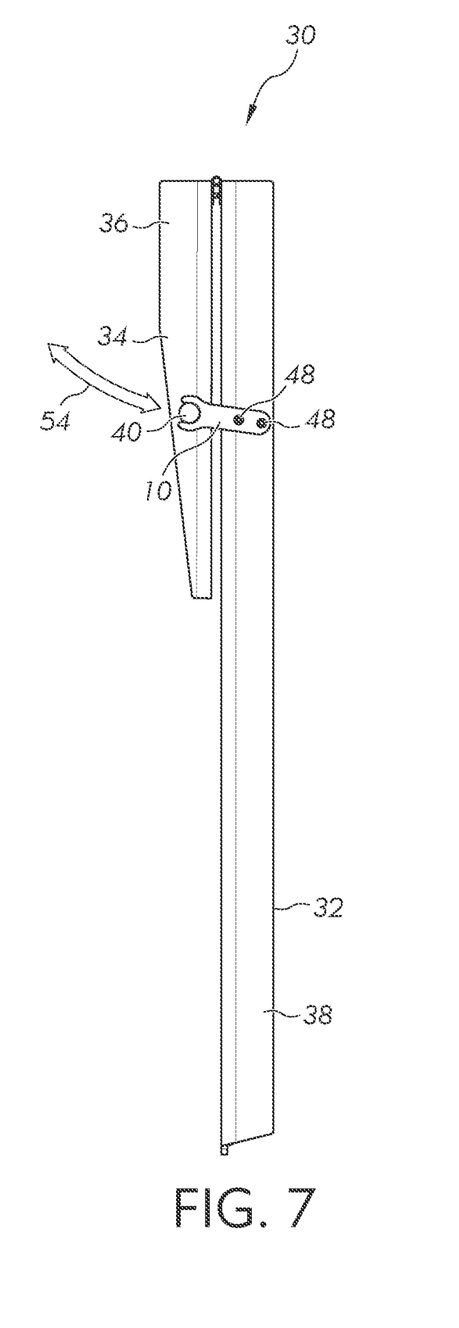
FIG. 7 represents another side view of the folded vehicle ramp assembly of FIG. 5.
Figure 8:
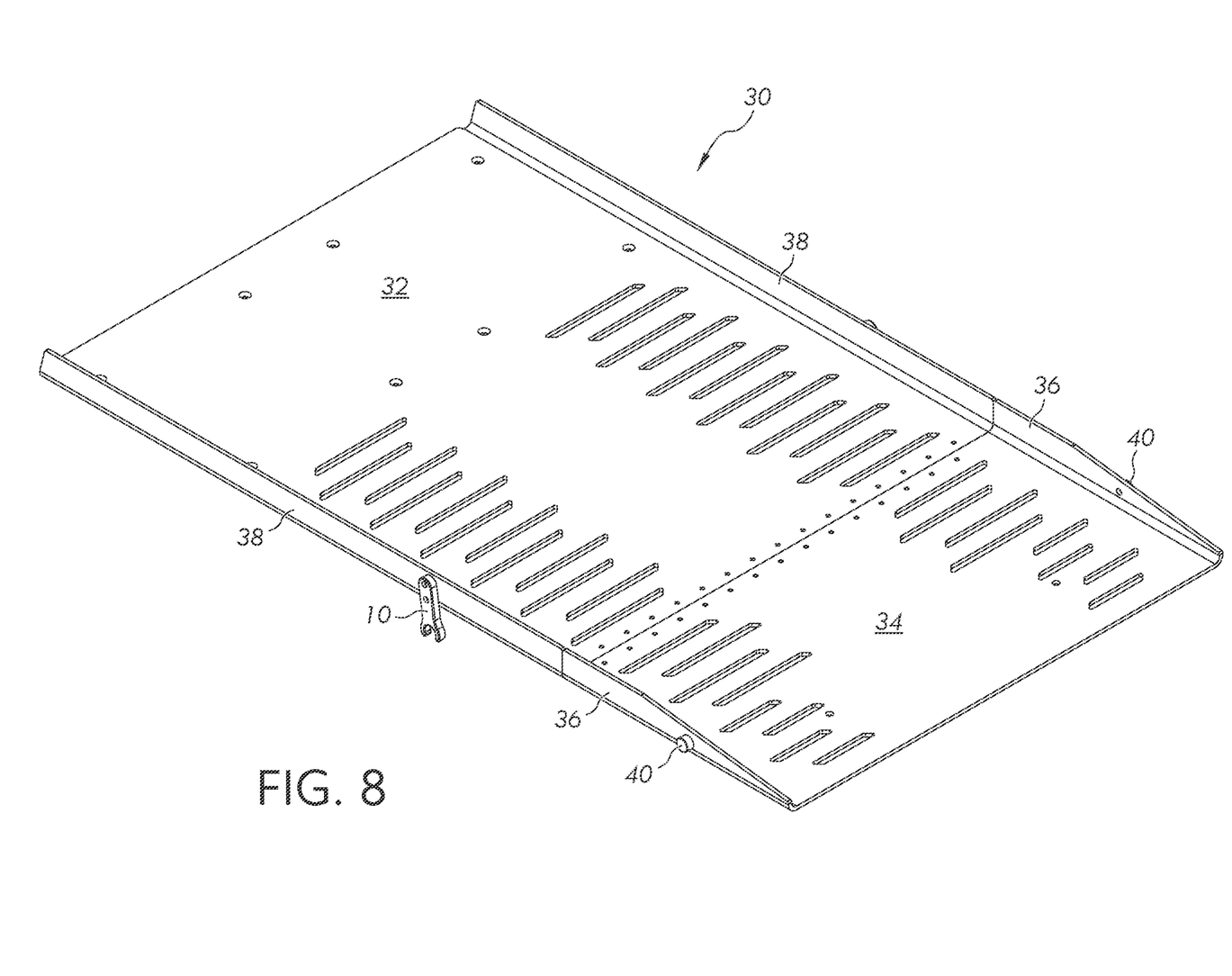
FIG. 8 represents the vehicle ramp assembly of FIG. 5 in an unfolded configuration and wherein the vehicle ramp latch of FIG. 1 is shown in an unlatched position.
Figure 9:
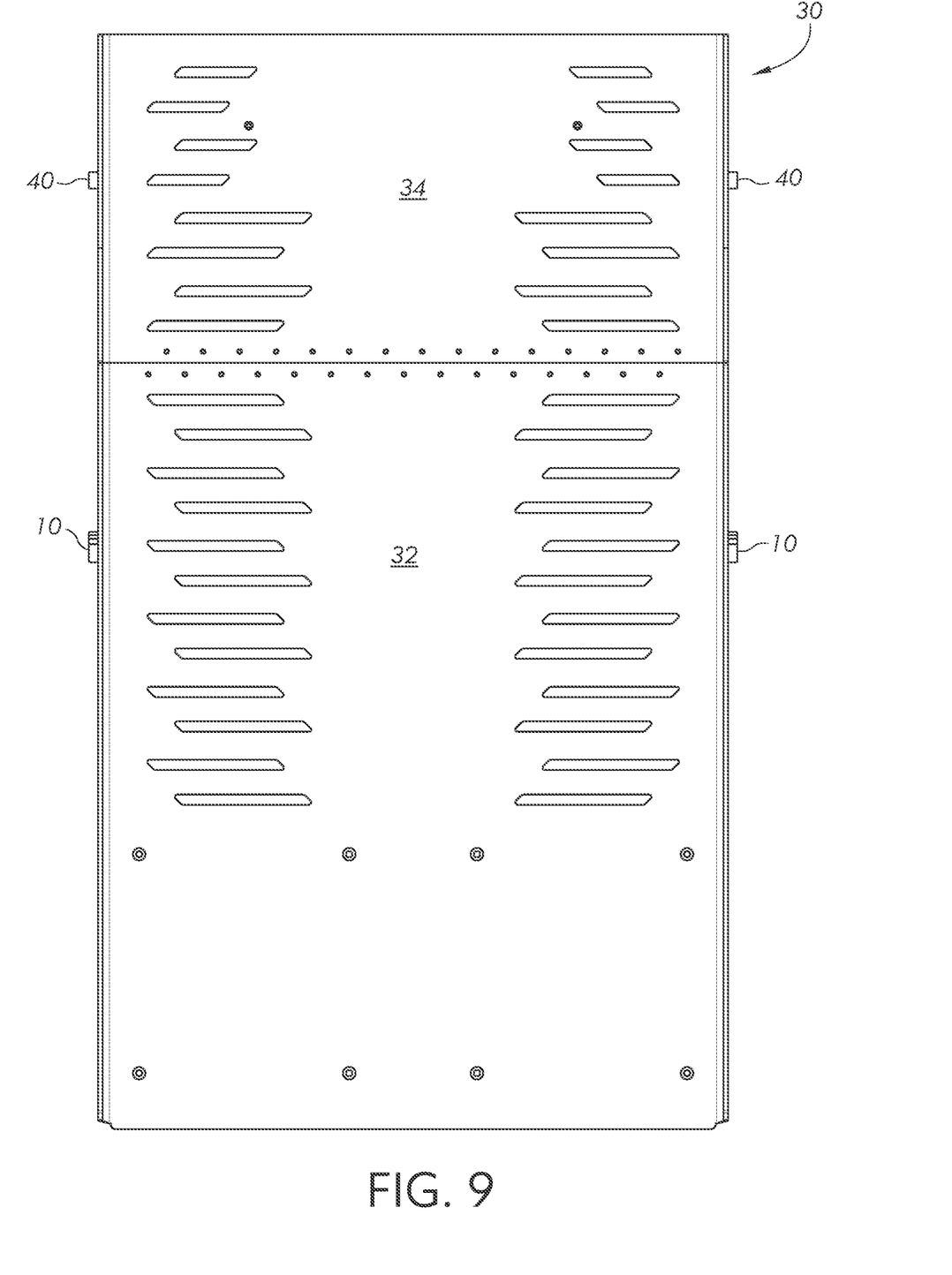
FIG. 9 represents a top view of the unfolded vehicle ramp assembly of FIG. 8.
Figure 10:
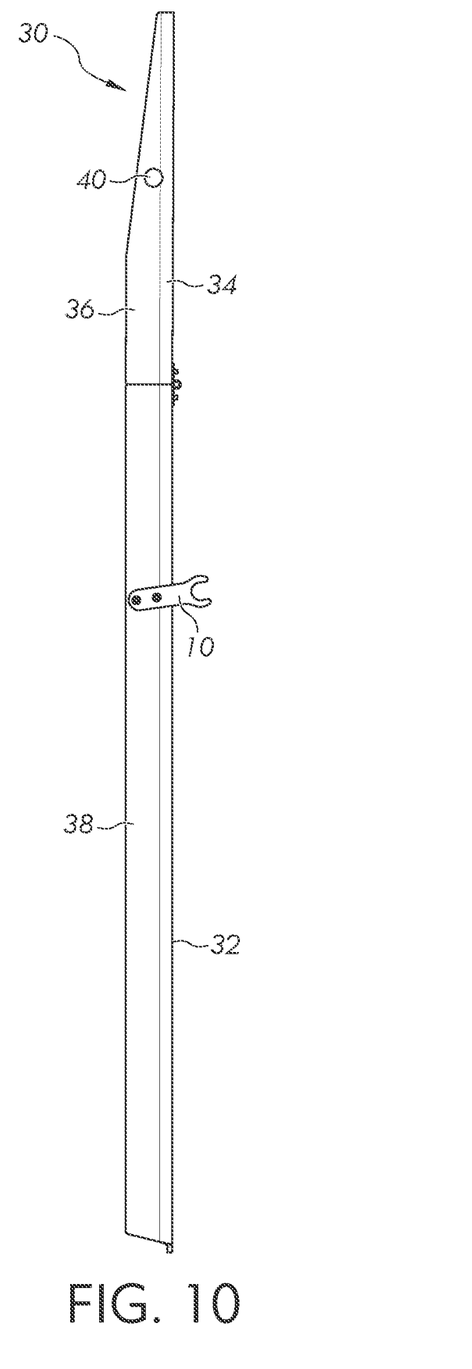
FIG. 10 represents a side view of the unfolded vehicle ramp assembly of FIG. 8.
Figure 11:
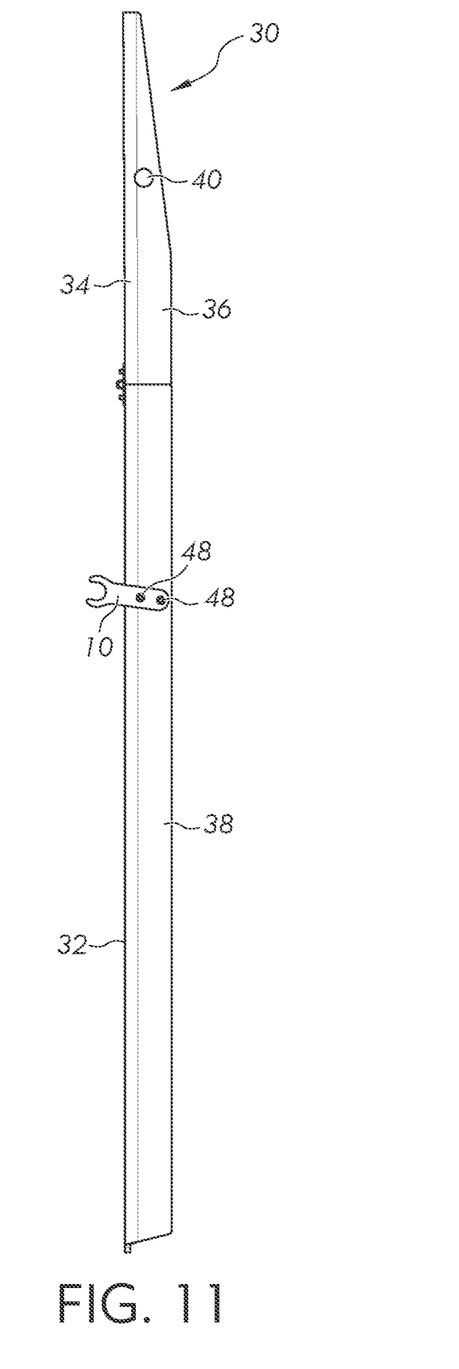
FIG. 11 represents another side view of the unfolded vehicle ramp assembly of FIG. 8.

The ramp sections 32, 34 further include side barriers, 36, 38, respectively, for preventing a ramp user from falling off the right or left sides of the deployed ramp. In accordance with certain embodiments herein, the side barriers 36, 38 include at least one knob 40 extending therefrom for receiving the jaws 22, 24 of the vehicle ramp latch 10. More particularly, when the ramp sections 32, 34 are folded substantially against one another in a stowed state, the jaw member 21 of the receiving jaws 22, 24 is configured to snappingly engage the knob 40 at the engagement surface 28 of the central opening 26. To accomplish this snapping or coupling effect, in accordance with certain embodiments herein, the inner periphery of the jaw member 21 is substantially the same or slightly smaller in circumference to the outer circumferential periphery of the knob 40. By having such a configuration, the knob 40 is able to snap into and become securely held within the jaws 22, 24 in such a manner that the ramp sections 32, 34 are forced to be held together while the vehicle is in motion.

In other words, the jaws 22, 24 may partially define a substantially circular opening having a jaw diameter 42. Further, each of the jaws 22, 24 may define a first and second terminus 44, 46 respectively along the distal section 16 of the jaws 22, 24. The first and second terminus 44, 46 may further define the central opening 26 as having an opening width 48 when the jaws 22, 24 are in a neutral position as shown in FIGS. 1-4. In one non-exclusive example, the opening width 48 may be slightly less than the jaw diameter 42.

In another aspect of this disclosure, the knob 40 may have a knob diameter 50 that is about the same as the jaw diameter 42. Since the central opening 26 is slightly smaller than the jaw diameter 42 and the knob diameter 50, the jaws 22, 24 may at least partially elastically deform when the knob 40 is forced into the central opening 26 until the knob 40 contacts the engagement surface 28. Once the knob 40 is in contact with the engagement surface 28, the jaws 22, 24 may return to the neutral position where the jaws 22, 24 define the opening width 48, thereby retaining the knob 40 therein.

A person having skill in the relevant art understands that the opening width 48 can be altered to change the force necessary to transfer the knob 40 into and out of the jaw member 21 (hereinafter referred to as the "knob transition force 54"). More specifically, if the opening width 48 is substantially smaller than the jaw diameter 42, then the knob transition force 54 may be higher than when the opening width 48 is minimally smaller than the jaw diameter 42. This is due, in part, to the amount of deflection or elastic deformation required in the jaws 22, 24. A smaller opening width 48 requires greater deflection of the jaws 22, 24 when the knob 40 is transitioning therethrough, thereby requiring a greater knob transition force 54.

In other embodiments, the material or thickness of the jaws 22, 24 may be altered to accommodate different latching properties. More specifically, a jaw thickness 52 may be altered to change the knob transition force 54. In this embodiment, the jaw thickness 52 may be increased to provide a greater knob transition force 54. Alternatively, the jaw thickness 52 may be reduced to provide a lesser knob transition force 54.

The knob transition force 54 may also be altered by forming the ramp latch 10 from materials with different material properties. More specifically, a material with more rigid material properties, such as hardened steel, may require a greater knob transition force 54 than a less rigid material such as a plastic or the like. Accordingly, the material by which the ramp latch 10 is formed will alter the knob transition force 54. Similarly, the knob 40 may be formed of different materials to accommodate different properties for deformation. Accordingly, this disclosure considers altering at least the opening width 48, jaw thickness 52, and jaw or knob material to alter the knob transition force 54 as described above, and is not limited to the exact configuration shown and described herein.

While the opening of the jaw member 21 and the knob 40 are shown and described as semicircular or circular and having a diameter, other shapes and sizes are also considered herein. More specifically, the jaw member 21 may be formed of substantially straight elements instead of the arcuate elements shown and described herein. More specifically, the jaw member 21 may have a substantially linear back portion that runs perpendicular to the longitudinal axis 18. Further, the jaws 22, 24 may be substantially linear and extend from the back portion away from the elongated shaft 12. In one aspect of this embodiment, the jaws 22, 24 may also taper slightly inwardly as they extend away from the elongated shaft 12. This configuration allows for the deflection of the jaws 22, 24 similar to the embodiment described above when the knob 40 is transitioned through the central opening 26. This disclosure contemplates many different configurations and shapes for the jaws 22, 24 and is not limited to the particular examples shown and described herein.

In another aspect of this disclosure, the engagement surface 28 may be made of material that has advantageous acoustic and frictional properties. More specifically, the engagement surface 28 may be made of a material such as polytetrafluoroethylene (hereinafter "PTFE") or the like to reduce the friction generated between the knob 40 and the jaw member 21. By coating the engagement surface 28 with PTFE, the knob 40 may slide more easily into, and out of, the jaw member 21. Further, PTFE may reduce the amount of noise or rattle generated between the knob 40 and the jaw member 21 when the knob 40 is positioned therein compared to other material such as steel.

Similarly, the outer surface of the knob 40 may be coated or made from any of the material described above to reduce friction or the amount of noise generated between the knob 40 and the ramp latch 10 when coupled to one another. While PTFE is specifically described, other materials such as plastics or rubbers are also considered herein, and this disclosure is not limited to the particular material explicitly described.

To pivot the vehicle ramp latch 10 with respect to its respective side barrier 36, 38, in accordance with certain aspects herein, the elongated shaft 12 is coupled to its respective side barrier by one or more pivot pins 48 or similar type of pivotable connection means.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations).

What is claimed is:

1. A ramp assembly, comprising:
   an inboard ramp section;
   an outboard ramp section pivotally coupled to the inboard ramp section;
   a knob coupled to one of the inboard ramp section or the outboard ramp section;
   a ramp latch fixedly coupled to the other of the inboard ramp section or the outboard ramp section, the ramp latch comprising;
      an elongated shaft extending from a proximal section towards a distal section;
      a first arcuate jaw extending from the distal section away from the elongated shaft;
      a second arcuate jaw extending from the distal section away from the elongated shaft, the first and second arcuate jaw defining an opening therebetween;
   wherein, the knob is selectively positionable at least partially within the opening
   further wherein, the engagement of the knob with the ramp latch maintains inboard ramp section in the folded state until a knob transition force rotates the inboard ramp section away from the outboard ramp section, thereby disengaging the knob from the ramp latch.

2. The ramp assembly of claim 1, further wherein the inboard ramp transitions between a folded state and a coplanar state relative to the outboard ramp section.

3. The ramp assembly of claim 2, further wherein the knob is at least partially positioned within the opening when the inboard ramp is in the folded state.

4. The ramp assembly of claim 3, further wherein the knob is not positioned within the opening when the inboard ramp is in the coplanar state.

5. The ramp assembly of claim 1, further comprising an inboard side barrier coupled to the inboard ramp section and an outboard side barrier coupled to the outboard ramp section.

6. The ramp assembly of claim 5, further wherein the knob is coupled to one of the inboard or outboard side barrier and the ramp latch is coupled to the other of the inboard or outboard side barrier.

7. The ramp assembly of claim 1, further wherein the ramp latch is configured to snappingly engage the knob.

8. A ramp latch assembly, comprising:
   an inboard ramp section pivotally coupled to an outboard ramp section;
   a ramp latch fixedly coupled to one of the inboard ramp section or the outboard ramp section;
   a knob coupled to the other of the inboard ramp section or the outboard ramp section to which the ramp latch is coupled;
   wherein, the ramp latch snappingly engages the knob when the inboard ramp section is in a folded state relative to the outboard ramp section;
   further wherein, the engagement of the knob with the ramp latch maintains inboard ramp section in the folded state until a knob transition force rotates the inboard ramp section away from the outboard ramp section, thereby disengaging the knob from the ramp latch.

9. The ramp latch assembly of claim 8, further wherein the ramp latch has a first arcuate jaw and a second arcuate jaw.

10. The ramp latch assembly of claim 9, further wherein the first arcuate jaw and the second arcuate jaw deflect as the ramp latch snappingly engages the knob.

11. The ramp latch assembly of claim 8, further comprising an inboard side barrier coupled to the inboard ramp section and an outboard side barrier coupled to the outboard ramp section.

* * * * *